United States Patent
Elliott et al.

(10) Patent No.: US 6,934,137 B2
(45) Date of Patent: Aug. 23, 2005

(54) PEER-TO-PEER CONTROL AND DECISION MAKING SYSTEM

(75) Inventors: Stephen H. Elliott, Bradenton, FL (US); William A. Klingbeil, Palmetto, FL (US)

(73) Assignee: Radiant Power Corporation, Sarasota, FL (US)

( * ) Notice: Subject to any disclaimer, the term of this patent is extended or adjusted under 35 U.S.C. 154(b) by 534 days.

(21) Appl. No.: 10/081,918

(22) Filed: Feb. 20, 2002

(65) Prior Publication Data

US 2002/0153776 A1 Oct. 24, 2002

Related U.S. Application Data

(60) Provisional application No. 60/270,298, filed on Feb. 20, 2001.

(51) Int. Cl.[7] .................................................. H02H 3/00
(52) U.S. Cl. .............................. 361/62; 361/64; 307/29
(58) Field of Search ............................ 307/66, 64, 9.1, 307/29; 725/76; 361/115, 93.1, 62, 64

(56) References Cited

U.S. PATENT DOCUMENTS

| 5,570,002 A | 10/1996 | Castleman .................. 323/283 |
| 5,615,105 A | 3/1997 | Tofigh et al. ................ 364/138 |
| 5,666,291 A | 9/1997 | Scott et al. ............... 395/200.8 |
| 5,745,159 A | 4/1998 | Wax et al. ....................... 348/8 |
| 5,936,318 A | 8/1999 | Weiler et al. ................. 307/66 |
| 5,939,997 A * | 8/1999 | Sekine et al. ............... 340/3.43 |
| 5,942,811 A | 8/1999 | Stumfall et al. .............. 307/64 |
| 5,973,722 A | 10/1999 | Wakai et al. ................... 348/8 |
| 6,016,016 A | 1/2000 | Starke et al. ................ 307/9.1 |
| 6,054,846 A | 4/2000 | Castleman ................... 323/283 |
| 6,249,913 B1 | 6/2001 | Galipeau et al. .............. 725/76 |

FOREIGN PATENT DOCUMENTS

EP          1 028 512     8/2000         ............. H02J/4/00

* cited by examiner

*Primary Examiner*—Stephen W. Jackson
(74) *Attorney, Agent, or Firm*—Darby & Darby

(57) ABSTRACT

A SkyCharger™ Node or "Node" that contains programmed instructions and/or "intelligence" for monitoring communication traffic on a communications network such that appropriate reactions to commands received over the communications network occurs. The "Nodes" also broadcast commands and status information to the network for the purpose of being monitored and/or responded to by other "Nodes" on the network. The "Nodes" provide a way to monitor, control, provide information to or from, or react to, information provided by way of SkyCharger™ network(s).

22 Claims, 5 Drawing Sheets

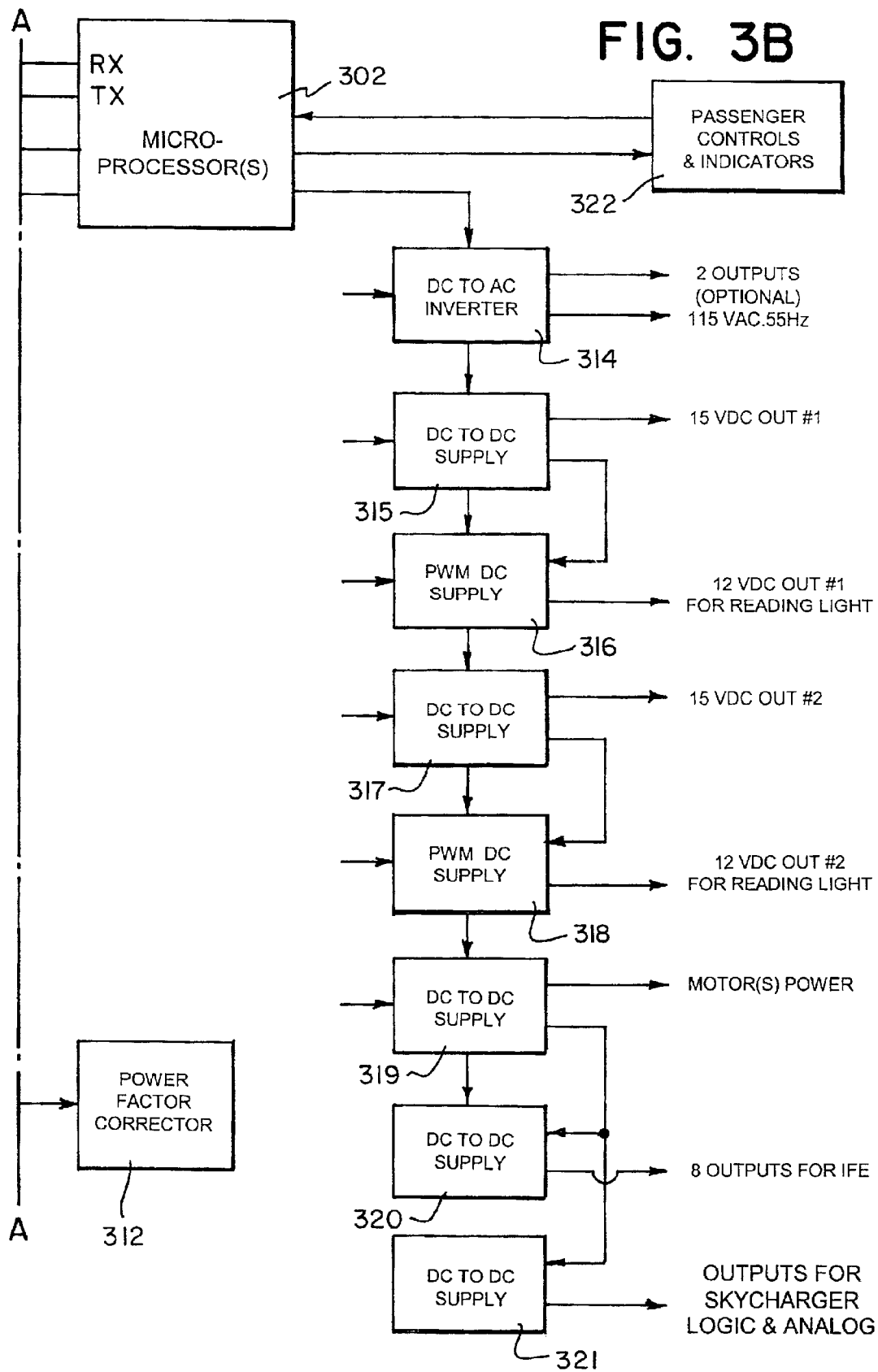

PEER-TO-PEER CONTROL AND DECISION MAKING SYSTEM

RELATED APPLICATIONS

The present invention relates to, and claims priority of, U.S. Provisional Patent Application Ser. No. 60/270,298 filed on Feb. 20, 2001, having the same title as the present invention, which is incorporated herein by reference.

BACKGROUND OF THE INVENTION

1. Field of the Invention

The present invention generally relates to the field of in seat power systems and, more particularly, to a peer-to-peer control and decision making system for controlling power application to a group of seats.

2. Description of the Related Art

When used in broadcast and industrial applications, large industrial and broadcast systems permit users to reliably control the systems, and to do so in real time. The majority of such systems are based on a "Two Layer Star Controlled System". That is, one central control computer, comprising a top layer "star" ("Master Control"), which controls local control computers. These local control computers each control smaller control logic or microprocessors, which comprise a second "star" layer.

Such a "tiered star" control system is used as a conventional means to control existing aircraft cabin power management systems. That is, the "Master Control" resides at an end of a network, and remote devices "request" permission to perform a given function from the master control. The "Master Control" subsequently "grants" the remote unit permission to proceed with the desired function, such as turning on a seat motor, a light, etc. This process is controlled in this manner because only the "Master Control" contains knowledge of the power consumption levels, which it periodically requests from the remote devices, as well as information concerning the available power. Here, the "Master Control" acts as a "traffic cop," telling each unit when to activate/deactivate a specific function.

While such systems work very successfully when used within industrial and broadcast applications, they tend to be overly expensive, due to the need for a multitude of powerful computers for providing the necessary control logic. For example, in conventional systems, the "Master Control" must be a very powerful computer, and hence an expensive computer. An inexpensive "Master Control" computer can quickly become overloaded when receiving and responding to messages such that the system quickly grinds to a halt. This means that the "Master Control" is an expensive device, one which many airlines have been unwilling to invest in for the perceived benefits. As a result, many of the installed systems are completely "dumb" systems, providing only DC power for laptop computers, and providing none of the benefits of power management, or ease of use. In some cases, airlines using competing systems are reduced to activating and deactivating the system via circuit breakers; a failure of a single unit requires the disablement of an entire column of seats by the flight crew. Although such an arrangement is inconvenient, many airlines are currently subject to the use of such systems.

An additional disadvantage of this hierarchal, or "Master control" type architecture, is that the decision making process is controlled by the top level controller. When the such a system receives a number of simultaneous requests, slow system response times may occur. The system can also completely fail, where a single point of failure is the "Master Control. " For example, a remote device must transmit a message for permission to perform a given function, such as turn on a motor. The "Master Control" must receive the message, decode it, and then transmit a message back to the remote device to thereby grant permission to the remote device to perform the specified function. The remote device then decodes this second message, prior to actually turning on the motor. If only a single unit at a time requests permission from the "Master Control", then the system can respond fairly quickly, with a minimum amount of perceptible delay between the time a passenger pushes a button and the actual movement of the motor. When multiple simultaneous requests from several users to the "Master Control" are made, significant time delays in responding to the requests can quickly occur, just like a busy server on the Internet can quickly become very slow in its response times.

Primex Aerospace Company manufactures an In-Seat Power system. According to this manufacturer, this system requires a "Master Control" for the system to operate. Another manufacturer, Kid Systeme GmbH, located in Germany also manufactures an In-Seat power system that also utilizes the aforementioned "Master Control". However, these In-Seat power systems posses the problems associated with a "Two Layer Star Controlled System." That is, they are overly expensive to manufacture, they possess slow response times, and they cease to operate when the "master control" fails. Accordingly; it is apparent there is a need for a lower cost, and more fault tolerant system for use in a commercial aircraft In-Seat Power System.

SUMMARY OF THE INVENTION

A SkyCharger™ Node or "Node" is a computing device which contains programmed instructions and/or "intelligence" for monitoring communication traffic on a communications network such that when appropriate a reaction to commands received over the communications network occurs. The "Nodes" also broadcast commands and status information to the network for the purpose of being monitored and/or responded to by other "Nodes" on the network. The "Nodes" provide a way to monitor, control, provide information to or from or react to information provided via SkyCharger™ network(s).

In accordance with the invention, a "Node" also possesses the ability to monitor and appropriately respond to commands or information sent by way of a "Gateway" unit, an appropriate maintenance communication device, or other valid external control device. Further, the "Node" possesses the ability to provide diagnostic information and status information to appropriate flight crew and to control and interface devices used by maintenance personnel. Each "Node" also has the responsibility to react to passenger controls that are located on a passenger seat to control power supplies, motors, lights, in-flight entertainment devices, and the like, which are located in each individual passenger seat(s), and to provide status information to the communication system regarding specific controls and devices.

The SkyCharger™ system of the present invention eliminates disadvantages associated with the "Master Control" configuration of "tiered star" control system, and is a system which is inherently more flexible, reliable, and easy to use than conventional "tiered star" control systems.

BRIEF DESCRIPTION OF THE DRAWINGS

The present invention may be more readily understood by one skilled in the art with reference being had to the following detailed description of the preferred embodiments thereof, taken in conjunction with the accompanying drawings wherein like elements are designated by identical reference numerals throughout the several views, and in which.

DESCRIPTION OF THE EXEMPLARY EMBODIMENTS

Figure 1:
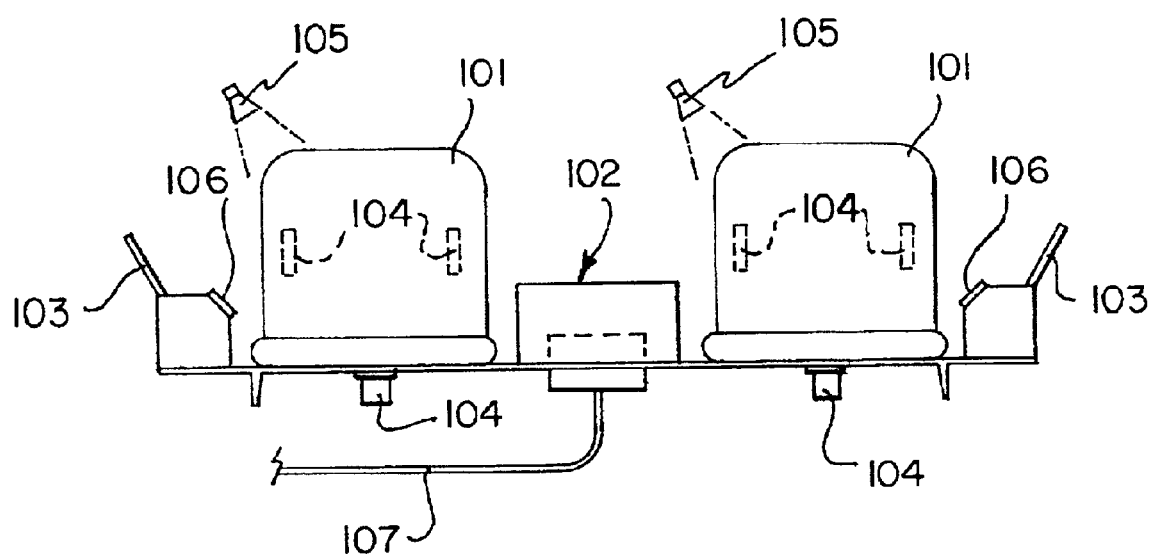
FIG. 1 is an exemplary illustration of the device in accordance with the invention installed in an aircraft seat;.

FIG. 1 is an exemplary illustration of the device in accordance with the invention installed in an aircraft seat. Shown therein are two passenger seats 101. SkyCharger™ system 102 is mounted in proximity to the passenger seats 101. The mounting configuration will depend on the specific requirements of an individual airline, and seat manufacturer, and is shown mounted in the middle of the seats in an exemplary location.

A SkyCharger™ Node or "Node" (in lower or capital case) is a computing device which contains programmed instructions and/or "intelligence" for monitoring communication traffic on a communications network such that when appropriate a reaction to commands received over the communications network occurs. The "Nodes" also broadcast commands and status information to the network for the purpose of being monitored and/or responded to by other "Nodes" on the network. The "Nodes" provide a way to monitor, control, provide information to or from, or react to, information provided via SkyCharger™ network(s).

In accordance with the invention, a "Node" also possesses the ability to monitor and appropriately respond to commands or information sent to it via a "Gateway" unit (not shown), an appropriate maintenance communication device (not shown), or other valid external control device (not shown). Further, the "Node" possesses the ability to provide diagnostic information and status information to appropriate flight crew, and to control and interface devices used by maintenance personnel. In addition, each "Node" has the responsibility to react to passenger controls which are located on a passenger seat to control power supplies, motors, lights, in-flight entertainment devices, and the like, which are located in each individual passenger seat(s), and to provide status information to the communication system regarding specific controls and devices.

In an embodiment of the invention, the "Node" provides a mechanism for interrupting 115 VAC, 400 Hz input power sources when a short circuit, ground fault, or other overload, or fault condition exists in a particular seat, seat device, or an additional device located "downstream" from a specific "Node. " If one or more of these fault conditions occur, the "Node" provides the fault information to the communications network.

In further embodiments of the invention, the "Node" is connected to the communications network. Here, the "Node" can include additional control devices that receive commands from aircraft systems (such as the ARINC 429 system), or flight and/or maintenance personnel devices, and additional devices being controlled by the communications network, such as other in-flight entertainment systems, which are not specifically part of the SkyCharger™ system 102, but which are capable of appropriately reacting to commands issued by the SkyCharger™ system 102. The flight and/or maintenance personnel devices monitor power consumption of other systems located on-board the aircraft, such as the power drawn by galley(s) or other cabin equipment.

In another embodiment of the invention, the "Node" controls other devices, such as lights, bells, audio and/or video controls via either electro-mechanical or solid state relay devices, or analog or pulse width output controls. Alternatively, the "Node" introduces such external control commands into the Sky Charger™ system 102 by way of contact closures, external digital interface mechanisms, external digital communications devices (serial or parallel), or external analog input voltages, sensors, and the like.

In-flight entertainment video screen 103 receives power from the SkyCharger™ system 102. Passenger control 106 is implemented by way of a touch screen, or by a control panel located on an arm rest or center console of the passenger seat, or on the back of a front seat, or by a "control phone" located in the arm rest or center console of the passenger seat. These controls are implemented using membrane switch mechanisms, push buttons, toggle switches, a touch sensitive display control integrated into, or separated from the in-flight entertainment system (I.F.E.), or by another appropriate human-machine interface mechanism. The SkyCharger™ Node computer(s) monitors the controls, transmits the passengers desired-action-information to the network for observation by all of the other "SkyCharger Nodes", and decides the appropriate response to the passenger's request. In an embodiment of the invention, I.F.E. systems having an integrated touch screen are used to control the SkyCharger™ system 102 instead of the separate passenger control 106.

The SkyCharger™ Node also monitors the amount of power being consumed by the in-flight entertainment system 103, and uses this information as one element of a power control decision-making process. The SkyCharger™ system 102 also provides the power and controls for multiple seat motors 104. The actions of these motors are determined by the passenger via the passenger control panel 106, and via requests from the communications network when the seat position must over-ride the passengers personal request (such as when preparing for landing or during an emergency). The SkyCharger™ system 102 also monitors the amount of current being consumed as each seat motor 104 operates to provide current limiting during motor overloads, and when computing the amount of power used as part of the power control decision-making process.

The SkyCharger™ system 102 provides the power and the control to in-seat passenger reading lights 105 for activating and deactivating the reading lights. In an embodiment, the intensity of the passenger reading lights 105 is variable, and the light dimming functions are controlled via the passenger control panel 106. Here, the light dimming function can be over-ridden by the flight crew controls via the communication network. The SkyCharger™ system also monitors the amount of power being used by the lights for use as part of a power control decision-making process.

Cable 107 provides input power and system communications. This cabling provides the 115 VAC, 400 Hz input power for the operation of all SkyCharger™ system 102 functions. The input power is monitored by the SkyCharger™ system 102 and the amount of input AC power being consumed is a major factor in the power control decision-making process. The AC input power is also monitored by the SkyCharger™ system for short circuit conditions, and for ground fault paths. In this case, the SkyCharger Node™ can disconnect the input power from the input AC power to protect the wiring and aircraft from dangerous conditions, and to protect passengers from possible shock hazards. In an embodiment, cable 107 provides a "loop through" function, where the AC power enters the SkyCharger™ Node, and then loops out of the "Node" to the next "downstream" "Node(s)". Cable 107 also provides a SkyCharger™ communications link via a multi-drop network. This communications link interconnects the in-seat power systems to form a "Peer to Peer" communications network, coupled with the decision-making process.

Figure 2A:
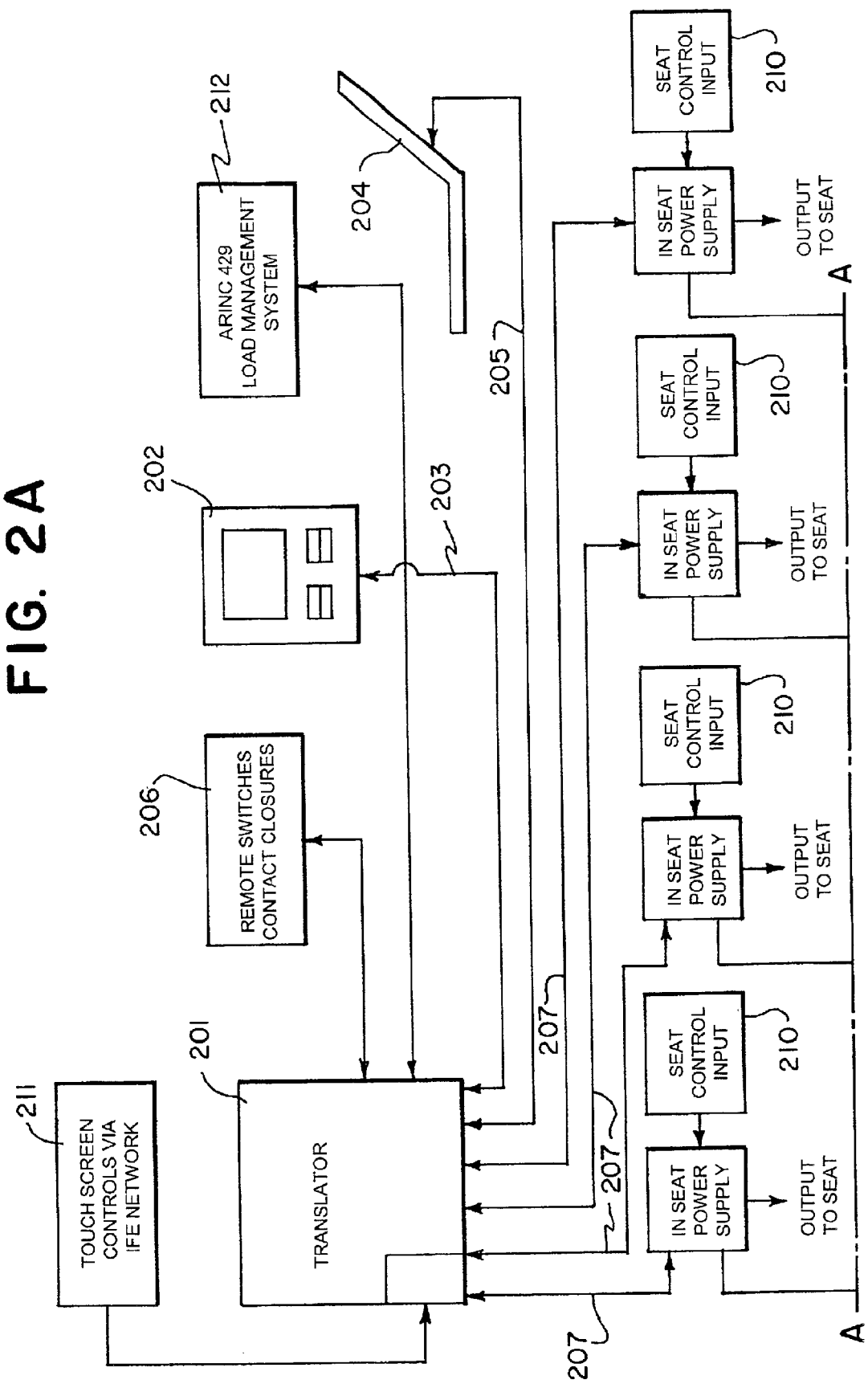
FIGS. 2A and 2B is an illustration of the device of FIG. 1 installed in an aircraft cabin.
Figure 2B:
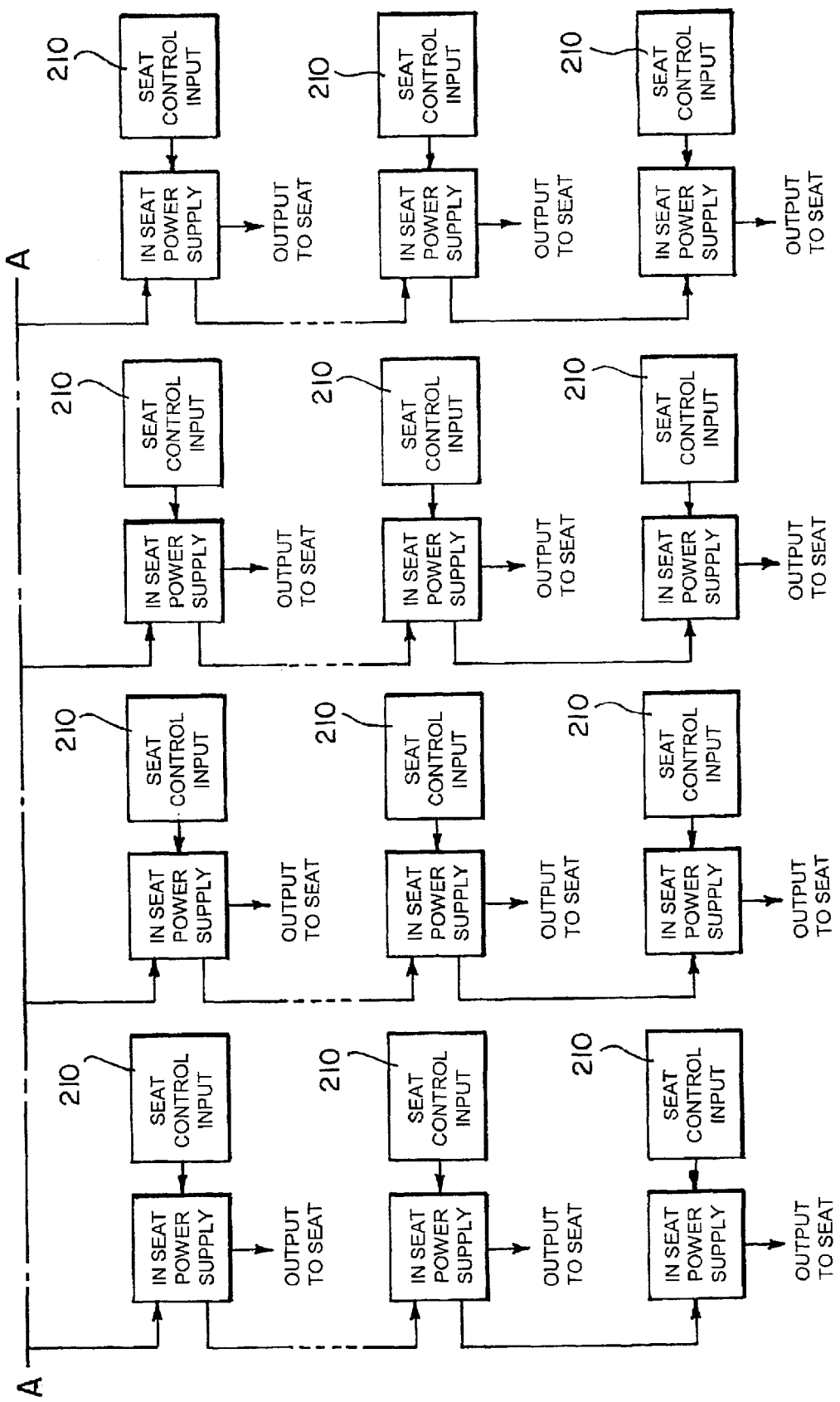

FIG. 2 is an illustration of the device of FIG. 1 installed in an aircraft cabin utilizing a number of SkyCharger™ systems. SkyCharger™ System Gateway 201 provides an external interface mechanism into the SkyCharger™ Network. The "Gateway" 201 links to at least one Flight Attendant Control Panel (FACP) 202 via a bi-directional communications cable 203. The FACP 202 provides a mechanism for the cabin crew to enable and disable various system functions when units malfunction, or to disable a particular seat due to an unruly child or other passenger.

In an embodiment, an optional maintenance laptop computer 204, or other maintenance control is used for system status, diagnostics, and repair. This maintenance computer 204, or other control device is connected to the SkyCharger™ Gateway 201 via a bi-directional communications cable 205. The "Gateway" 201 also facilitates the connection of external contact closures, external switches or relays 206, which perform system on/off functions when activated/deactivated by the flight crew. In an embodiment, the external closure functions are programmed upon system installation to suit the particular requirements of an airline and to perform a variety of control tasks.

"Peer-to-Peer" network 207 provides a way for each element within the SkyCharger™ system 102 to ascertain the available power levels, the amount of power being used, requests for further power, and system fault conditions. The "Peer-to-Peer" network 207 provides a "distributed intelligence" of the SkyCharger™ network which uses this commonly shared information and renders decisions on the utilization of the available aircraft power. The "Peer-to-Peer" network 207 also provides a way to monitor the power usage by a remote computer or control panel that is used to monitor the SkyCharger™ system 102 status, with respect to an individual seat's current operations and possible fault conditions, the control of the system by flight crew or maintenance personnel, and the disablement of faulty "Node(s)" by the flight crew or maintenance personnel. The "Peer-to-Peer" network 207 also permits the SkyCharger™ system 102 to be programmed with respect to the available power on a particular aircraft, the required shutdown and fault conditions, the seat assignments and the functions available for a particular seat (or seating class). Using the Peer-to-Peer network, the SkyCharger™ system 102 develops a "personality" for a particular airline, aircraft, seating configuration, etc.

In accordance with embodiments of the invention, the "Peer-to-Peer" network 207 is implemented in various electrical interface forms, such as "Ethernet", "CAN" (Control Area Network Bus), RS-485 (Twisted wire differential serial bus), or other multi-drop communications mechanism. In a specific embodiment, the mechanism is an Infrared, or Radio Frequency communications system. In contrast to typical RS-232 communications, it is essential for the "Peer-to-Peer" network 207 to possess electrical characteristics that permit a data bandwidth that is sufficient to support any required communications "traffic", and for the network 207 to permit interconnection of the multiple "Nodes" on a single cable. In the preferred embodiment, the "Peer-to-Peer" network 207 is a "CAN" network. However, the "Peer-to-Peer" network of the preferred embodiment is not dependent upon the actual electrical interface used, with the aforementioned restrictions, nor upon the specific communications protocol software used for the various "Nodes" to communicate.

In addition to the control of individual SkyCharger™ systems by the flight crew or maintenance personnel, as indicated in items 202, 204, and 206, there are other control processes available that are implemented. In the preferred embodiment, primary process control is available to an individual passenger. This is made possible by way of passenger seat controls 106, 210, and possibly by way of 103 when a touch screen is installed. With these controls, passengers can move various seat motors 106, turn on and off the reading light(s) 105, adjust the reading light intensity, turn on and off the in-flight entertainment system 103, and turn on and off the in-seat power ports (not shown). These passenger controls either wire into the SkyCharger™ Node by a cable located in the seat. Alternatively, if the passenger controls are by way of the in-flight entertainment system touch screen panel, the control flows from the in-flight entertainment system communications network 211 to the SkyCharger™ Gateway 201. The "Gateway" subsequently provides a translation of commands generated by the in-flight entertainment system 103 and converts these commands into commands that are recognizable by the SkyCharger™ Network 207.

When the passenger requests a specific function, suen as moving a seat back motor via a seat located pushbutton, the SkyCharger™ Node responsible for that seat compares the power required by the function with information concerning the available power. If the amount required is within a predetermined "power budget," a local "Node" then immediately initiates the operation of a motor, and broadcasts revised power consumption information to the network. As a result, response latencies between passenger requests and the time of the actual result are reduced, when compared to a remote "Master Control" type system.

Using commands received from an aircraft's load management system via the ARINC 429 data bus 212, the aircraft load management system computer (not shown) of the aircraft can provide the SkyCharger™ system 102 with information regarding avaulable power from the aircraft's generators, and can initiate emergency non-essential system shutdowns, such as shut down the SkyCharger™ units. In addition, flight crew controls can be linked into the SkyCharger™ network 207 via the ARINC 429 data bus 212 through this "Gateway" translation.

Figure 3A:
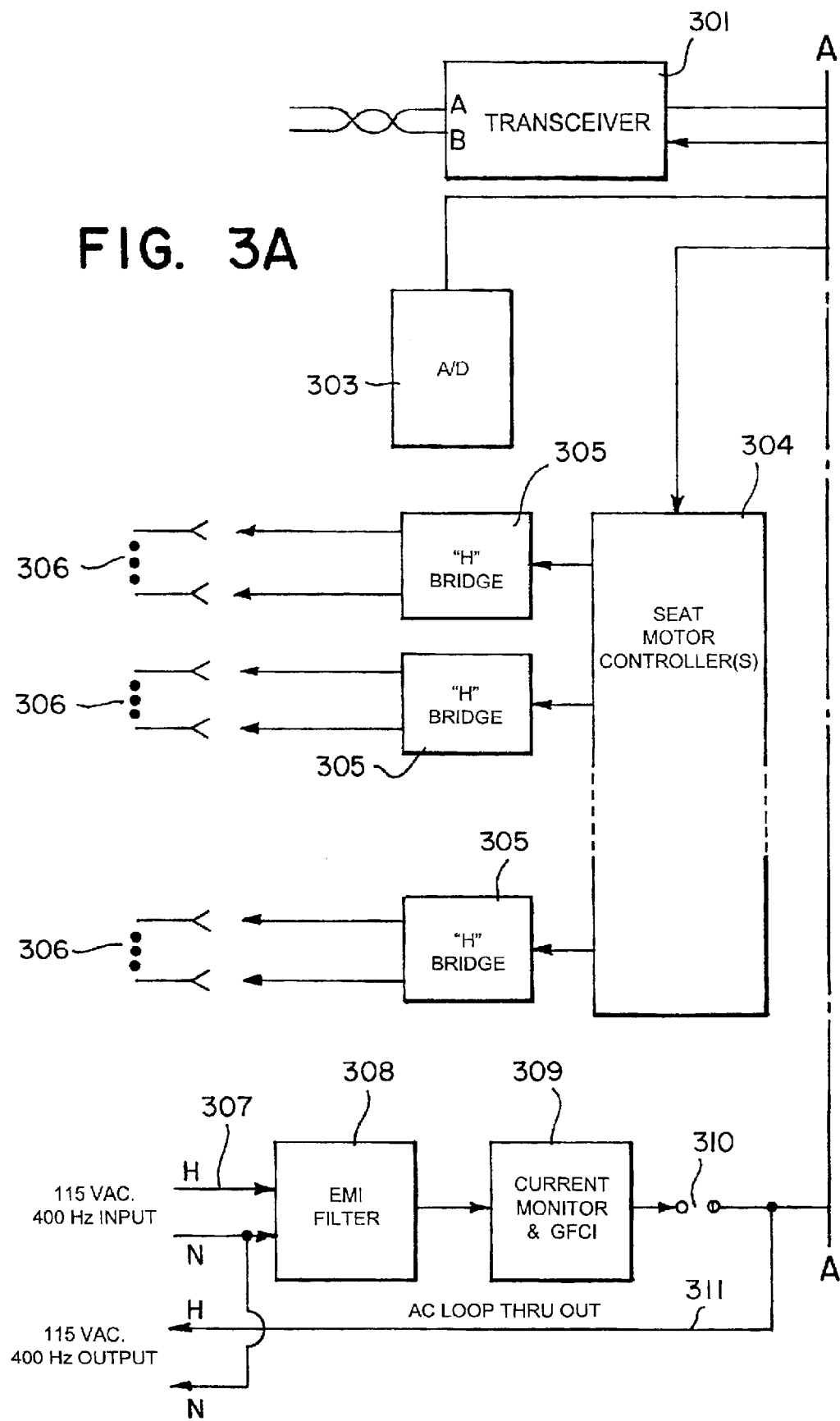
FIG. 3 is a schematic block diagram of electronic subsystems in an individual "Sky Charger Node" in accordance with the invention.

FIG. 3. is a schematic block diagram of electronic subsystems in an individual SkyCharger™ Node in accordance with the invention. Here, the various hardware elements in a typical SkyCharger™ Node are shown. It is to be understood that some versions of the SkyCharger™ Node are more complex, and others simpler. However, all SkyCharger™ Nodes posses a control microprocessor, a communications connection to the SkyCharger™ Network, and auxiliary devices, such as power supplies, sensors, etc.

The "Node" connects to the SkyCharger™ Network via communications transceiver and packet processor 301 which is used in a CAN or Ethernet environment to perform address recognition, error detection and correction, buffering, and the like. The input and output of transceiver 301 are connected to the SkyCharger™ Node control processor 302. This processor provides the "intelligence" for the SkyCharger™ Node, receives commands from the SkyCharger™ Network, and broadcasts information to other "Nodes" on the network. Depending on the how the SkyCharger™ is configured, there may be more than one microprocessor in a given SkyCharger™ system. In a preferred embodiment, communication to the network is only by way of one microprocessor, which will then transmit messages to, or from the other microprocessors in the system. Accordingly, the term microprocessor(s) as used in the preferred embodiment may be more than one processor.

An analog to digital converter and multiplexer 303 monitors a number of different inputs via the multiplexer, and other analog conditioning devices. These inputs may include the currents drawn by the various motors 306, the respective voltages and currents being generated and drawn by the different power supplies 314, 315, 316, 317, 318, 319, 320, and 321, the current being drawn on the 115 VAC, 400 Hz input power 307, any ground fault current drawn during a fault condition 309, and may include temperature monitoring of various components. These analog values are converted into digital values by the analog to digital converter 303, and processed by the microprocessor(s) 302. The digital values of the information output from the analog to digital convertor is subsequently used by the microprocessor 302 to determine the power being used by the various devices, and to disconnect devices when over-temperature and fault conditions occur.

Seat motor controller 304 generates the direction and start/stop information for the various seat motors 104. In an embodiment, the seat motor controller 304 is implemented in programmable or discrete logic, or by way of a microprocessor(s) or digital signal processor(s), depending on the number of motors, and required motor functions. The outputs of the motor controller(s) 304 are then used to control either solid state or electromechanical relays, or solid state "H bridge" devices 305. In preferred embodiments, the solid state relays, and "H bridges" are a collection of discrete electronic devices, or integrated solid state relays.

The solid state relays or "H bridges" 305 posses current and voltage rating that are sufficient to control external motor loads 306. These motors are located in the passenger seat 101 to actuate various seat functions, such as foot rests, head rests, seat lumbars up and down movements, etc. In preferred embodiments, there are up to 18 motors controlled by a single SkyCharger™ system 102. It is also to understood that a larger system can be constructed to include an even larger number of motors 306.

The power supply sections of the SkyCharger™ node comprise the majority of the additional items in FIG. 3. The input power comes from the power systems of the aircraft, and is 115 VAC, 400 Hz 307. In an embodiment, it is possible to monitor the input power for overload and/or ground fault conditions, where the power is disconnected from the input power during fault conditions.

In other embodiments, the input 115 VAC 307 can also be "looped thru 311" to the next SkyCharger™ system. This loop thru also permits an individual SkyCharger™ system 101 to deny power to a "downstream" SkyCharger™ system should the overload and ground fault current sensor detect a short circuit, ground fault, or other fault condition. This capability to disconnect power is provided by a disconnect relay 310. As a result, the safety monitoring of "downstream" devices is greatly enhanced and the system is protected from potentially dangerous shock, or fire hazards.

The input power is also filtered by an electromagnetic interference filter (E.M.I) 308 that ensures that external noise sources do not enter the electronics of the SkyCharger™ system 101 and that no E.M.I. source within the SkyCharger™ system 101 is emitted from the unit to thereby enter the aircraft's power system.

Power monitor and ground fault detector circuitry 309, monitors the voltage and current of the input 115 VAC 307, and whether any current is diverted from the intended return path (AC neutral) to the aircraft ground, which could indicate a hazardous short circuit condition, or human shock hazard. The output value from the power monitor and ground fault detector circuitry 309 is forwarded to the A/D convertor 303, and "read" by the control microprocessor 302. Relevant "trip" values for ground faults and overload conditions are programmable by the SkyCharger™ Network 107, 207, and 301.

The input 115 VAC, 400 Hz power is "Power Factor Corrected" by a Power Factor Corrector 312, which reduces harmonic currents generated by various loads in the SkyCharger™ system 101, and converts the input 115 VAC 307 into a high voltage DC buss 313, which outputs a high DC voltage. In the preferred embodiment, the high DC voltage is approximately 250 VDC. This high DC is distributed to various power supplies 314, 315, 317, and 319 for conversion into voltage levels (discussed subsequently).

AC inverter 314 converts the input high DC voltage to a 115 VAC, 55 Hz output, which can operates conventional consumer electronics. This "inverter" converts the aircraft's 115 VAC, 400 Hz power to 115 VAC, 60 Hz power such that various low power consumer devices can be operated on-board the aircraft. In addition, the voltages and currents from this inverter are monitored by the A/D converter 303 for use in computing the overall power being consumed by the "SkyCharger" system 101.

DC-to-DC power supply 315 also receives the high DC voltage and converts it into an isolated 15 VDC supply for powering consumer devices, such as laptop computers, hand-held video games, cell phones, etc. DC-to-DC power supply 315 also provides power for a power supply 316 for the reading lights. In an embodiment, this reading light power supply operates as a variable brightness dimmer unit via a Pulse Width Modulated control (not shown) that is controlled by the microprocessor(s) 302 by way of the reading light control(s) 324.

DC-to-DC power supply 317, which is identical to DC to DC power supply 315, provides a second isolated 15 VDC output voltage, and powers a second reading light power supply 318. In an embodiment, this second reading light power supply also possesses variable dimming and is controlled by another control line 324.

Motor power supply 319 provides power for operating the motors 306, and also provides a DC voltage that is used by a power supply 320 to provide power for use by an in-flight entertainment system (I.F.E.) and a power supply 321 to provide power for local board electronics 321. The actual arrangement of the power supplies depends on the specific application, with some systems of the preferred embodiment containing a greater number of power supply outputs, less power supply outputs, and differing output voltages. With the above power supply arrangement, multiple power supplies can be controlled by way of the SkyCharger™ Node computer and via remote control through the SkyCharger™ Network.

Passenger seat controls and indicators 322 permit a passenger to control the seat motors, the lights, the I.F.E. on/off control, etc. These controls are typically a serial link to/from the seat arm to the SkyCharger™ microprocessor 302. Using requests from the passenger seat controls and indicators 322, the SkyCharger™ microprocessor 302 "reads" the requirements of the passenger, and responds to specific requests after determining whether there is sufficient power to implement a specific request.

Power supply controls 323 provide the SkyCharger™ microprocessor 302 with away to turn on/off the various power supplies when required. Preferable the digital control lines are used to activate various solid state or electromechanical relays for output controls.

In accordance with embodiments of the invention, a SkyCharger™ Peer-to-Peer system operates on a shared information—individual node decision process. The decision-making rocess relies on each SkyCharger™ system being programmed with specific information upon system installation. The SkyCharger™ system then dynamically updates itself throughout normal day-to-day operations. Upon installation the system is initially programmed on a "Node" by "Node" basis. That is, each "Node" is provided with information concerning its seat assignment(s), what devices it will operate, what the current limits are for each device, and other "housekeeping" and safety information. Each SkyCharger™ Node is programmed with a unique identity, typically based on the seat assignment, or "Node" access ID. Likewise, the "Gateway" is programmed upon system installation, where its relevant parameters are translation functions for linking into an in-flight entertainment system, what input devices are available for the flight crew and maintenance personnel, and the like.

Through the "Gateway" the entire system is then programmed with aircraft specific information, such as the available power, the configuration of the in-flight entertainment system, the operating parameters of back lights of the in-flight entertainment system, the reading light characteristics, what specific units are on the network, and the like. This information is "read" by all SkyCharger™ Nodes on the system, and is stored in each "node" microprocessor's local memory.

In certain embodiments, an actual "Gateway" may not be installed on the aircraft. Rather, a "Portable Gateway" unit would be temporarily connected to the SkyCharger™ Network for downloading the aircraft specific information into the SkyCharger™ for installation or maintenance purposes. A "Portable Gateway" would then be disconnected from the SkyCharger™ Network during normal flight operations. Here, the information from the "Portable Gateway" would also be stored in microprocessor memory of each local Skycharger™ Node.

In embodiments of the SkyCharger™ system where a "Gateway" is not installed within the system, the network stills function from "Node" to "Node", where power management is performed based on the stored aircraft configuration information. In such systems, access of the flight crew to the system controls is limited. Nevertheless, such a system can operate without any "Gateway", based solely on the decision-making basis of the individual "Nodes." Here, individual "Nodes" are freed from any "top level" device (e g. a "Master Control") necessary for the system to provide its required functions. In preferred embodiments, such functions include using the available power efficiently without overloading the system, responding to load changes, shutting down individual units in overload and fault conditions, etc. , all without "master control" type decision-making being required.

In accordance with certain embodiments of the invention, an operational mode of the SkyCharger™ system is as follows: Upon initially receiving a "power on reset", the system "awakens". The individual SkyCharger Nodes enter a system status "polling" state, where each "Node" sequentially announces its location and status. As each new "Node" "introduces" itself, all other devices listen to the "Node" introductions and stores the relevant information regarding each of the other "Nodes" in its local microprocessor memory. The "Gateway" also observes this activity and stores the information in its microprocessor(s) memory.

Once all of the "Nodes" on a system have announced themselves, they switch to a status reporting mode, which regularly and sequentially reports what devices are being used, and the current power consumption for each "Node". The "Gateway" displays this information on flight crew and/or maintenance displays, and the other "Nodes" utilize this information to calculate the amount of remaining power. When a passenger turns on a switch, e.g., a light, the SkyCharger™ system for that seat then knows how much power is available from the aircraft, and decides whether that light can in fact turn on. If there is ample power in reserve, the SkyCharger™ system then immediately turns on the light.

If, however, there is an insufficient amount of power remaining, then an alternative process is used. Here, the SkyCharger™ of a local seat which requires the power will then request additional power from the network. The decision to grant more power is based on the class of the seat (first class having higher priority), the nature of the load being requested (seat motors are short term, transient loads, which can quickly end), and whether that seat has been a nuisance, such as due to a child playing with the controls. In embodiments of the invention, the network responds by shedding lower priority loads Alternatively, the network gains additional power by slightly dimming the reading lights, or the back lights of the in-flight entertainment system display.

In another embodiment, the SkyCharger™ power management system possess the ability to "listen" to the ARINC 429 bus of the aircraft main power management unit, where the SkyCharger™ system dynamically adjusts the power available according to the power reserves that the aircraft power management unit reports for the cabin power.

In a further embodiment, the SkyCharger™ Node is a galley power monitor which is also connected to the SkyCharger™ Network. In accordance with the present embodiment, this Galley Power Monitor Node reports when heavy power usage in the galleys exists, such as during the preparation of a meal, and when there is a slight power usage in the galley. Here, the SkyCharger™ system can increment or decrement the amount of power allotted for use by the passengers based on this information. By being able to share the power utilization information throughout the SkyCharger™ system, and each node then being able to make dynamic decisions based on changing information, the SkyCharger™ system is able to constantly adjust the usage of the available power for maximum efficiency and passenger convenience.

To manage power in a sudden very high demand situation, such as preparing powered seats for landing, the skyCharger™ network allots power in a sequential order based on the class of the seats, and the power required. Each SkyCharger™ is aware of its location, and therefore its priority. In the case of an emergency the flight crew can activate an emergency shut down. The SkyCharger™ system will then deactivate all unnecessary functions, immediately return all powered seats to the upright condition, and then lock out all passenger power request capabilities, until the emergency condition is cleared. As a result, a cabin can be quickly and safely prepare for an emergency landing, and the like.

In addition to constant power monitoring, the SkyCharger™ system also performs another safety function. That is, the SkyCharger™ system constantly monitors the system for ground faults, overloads, over-temperatures, and short circuit conditions. If a dangerous condition is detected by a SkyCharger™ Node that "Node" will immediately disconnect the fault, and if necessary disconnect the downstream 115 VAC input power loop-thru, thus denying power to a potentially faulty unit. As a result, maximum safety to the passengers and to the aircraft's electrical system is provided.

In accordance with embodiments of the invention, the SkyCharger™ also possesses the ability to monitor the ground fault current for each "Node" and to adjust the safety limits to dynamically balance the system for different loading conditions. As a result, passenger safety is maximized, while at the same time the number of nuisance ground fault trips is minimized. If an individual SkyCharger™ microprocessor malfunctions, built in circuitry in each SkyCharger™ Node automatically disconnects the faulty "Node" from the network such that an individual unit cannot cause other units to malfunction. As a result, the reliability of the SkyCharger™ system is further enhanced.

The system of the exemplary embodiments provides significant commercial benefits over conventional systems, due to the cost reduction which is achieved by eliminating the "master controls" which are required by the prior art systems, and reducing power consumption, as well as the number of computers required. The system is also an inherently more reliable system, because the decisional process is distributed throughout each system "Node", and therefore provides a greater tolerance of single point failures.

Within the SkyCharger™ system of the present invention, each "Node" on the system network has the ability to make control decisions based on commonly shared information. These decisions pennit rapid response times to passenger requests for seat functions, without the delays inherent in a "Master Control" based system. These decisions maximize usage of a limited resource (aircraft power) and permit utilization of that resource in an efficient manner. All of the "Nodes" on the "SkyCharger" network are aware of their peers, and "know" what their priority is, based on their cabin locations, with first class possessing the highest priority, and coach possessing the lowest. Each "Node" therefore. independently decides passenger device requests, with the system only requiring allocation delays in the rare event of a power shortage.

In the presence of low power levels, numerous methods are available for the system's use to gain additional power for additional power requests. In accordance with the exemplary embodiments, when additional power is not available, then new requests are ignored until additional power becomes available. The SkyCharger™ system also permits external information to be introduced into the SkyCharger™ network via a "Gateway" system, which permits maintenance and flight crew personnel to control and monitor the system. The SkyCharger™ system can also receive control commands from some in-flight entertainment systems that is translated by the "Gateway" and broadcast through the SkyCharger™ Network.

Additional "Nodes" can be added to the SkyCharger™ system for monitoring additional cabin power devices, such as the galley. This permits the use of that power as a factor in a power available calculation for each "Node" in the SkyCharger™ system. The SkyCharger™ system can also use the information from the aircraft load management system through the ARINC 429 data bus, translated through the "Gateway" and used again in the available power computations. The SkyCharger™ system constantly monitors itself for safety, and an automatically disconnect faulty devices, or hazardous conditions to ensure passenger and aircraft safety. Further, the SkyCharger™ utilizes a unique, low cost "Peer-to-Peer" control approach that provides substantial advantages over conventional systems.

While the invention has been particularly shown and described with reference to a preferred embodiment thereof, it will be understood by those skilled in the art that various changes in form and details may be made therein without departing from the spirit and scope of the invention.

What is claimed is:

1. A system for controlling power distribution in an aircraft, comprising:
   a first interface;
   a plurality of nodes connected to the interface; each of said plurality of nodes monitoring and responding to commands received from the first interface;
   a communication network interconnecting each of the plurality of nodes and the first interface; and
   a second interface for receiving commands from an aircraft load management system, wherein power distribution is controlled in accordance with the commands.

2. The system of claim 1, further comprising:
   a control device operably coupled to the first interface; said control device providing a flight crew with control over the system;
   an in-flight control device having a touch screen; said device providing a passenger with control over multiple functions at each seat in the aircraft; and
   a computer device operably coupled to the first interface; said computer device providing maintenance of the system by way of software which reside on the computer.

3. The system of claim 1, further comprising:
   external closures and external switches or relays which perform system on/off functions when activated/deactivated by the flight crew.

4. The system of claim 3, wherein the external closures are programmed upon installation of the system.

5. The system of claim 2, further comprising:
   passenger seat controls.

6. The system of claim 5, wherein the in-flight control device activates various seat motors, turns on/off at least one reading light, adjusts light intensity of the at lest one reading light, and turns on/off in-seat power ports.

7. The system of claim 5, wherein the passenger seat controls move various seat motors, turn on/off at least one reading light, adjust light intensity of the at least one reading light, turn on/off the in-flight entertainment system, and turn on/off in-seat power ports.

8. The system of claim 1, further comprising:
   a gateway controller coupled to the first interface.

9. The system of claim 8, wherein the gateway controller is a removable.

10. The system of claim 1, wherein the communication network is a inter-node and power communication network.

11. The system of claim 10, wherein the communication network is one of an Ethernet network, a CAN bus and a Twisted wire differential serial bus.

12. The system of claim 1, wherein the second interface is an ARINC 429 data bus.

13. The system of claim 1, wherein each of the plurality of nodes comprises:

a communication transceiver and packet processor operable coupled to the communication network; said communication transceiver performing at least one of address recognition, error detection and correction, and buffering;

an input voltage module supplying power to a respective node;

a control processor; said processor receiving commands from the communication network and broadcasting information to other nodes on the network;

an analog to digital (A/D) convertor and multiplexer; said A/D convertor and multiplexer monitoring inputs received by the multiplexer; and a plurality of power supplies receiving and converting power from the input power module.

14. The system of claim 13, wherein the inputs received by the multiplexer are currents drawn by various motors in the aircraft, voltages and currents generated and drawn by power supplies in the aircraft, current being drawn by the input voltage power module, and any ground fault current drawn during a fault condition.

15. The system of claim 13, wherein the input voltage module operates at 115 VAC, 400 Hz.

16. The system of claim 13, wherein the plurality of power supplies comprise:

at least one DC-to-AC invertor;

at least one DC-to-DC power supply; and at least one pulse width modulated control.

17. The system of claim 13, further comprising:

passenger controls and indicator; said controls and indicators permitting a passenger to control seat motors, activation and deactivation of the in-flight entertainment system.

18. The system of claim 13, further comprising:

solid state relays; and seat motor controllers coupled to the relays.

19. The system of claim 18, wherein the seat motor controllers generate direction and start/stop information for seat motors seats in the aircraft.

20. The system of claim 19, wherein the seat motor controller is implemented by way of one of programmable or discrete logic, and at least one microprocessor and digital signal processor.

21. The system of claim 18, wherein outputs from the motor controllers control at least one of solid state and electromechanical relays and solid state "H bridge" devices.

22. The system of claim 20, wherein the solid state relays and "H bridges" are one of discrete electronic devices, or integrated solid state relays.

* * * * *